United States Patent [19]

Ishioka

[11] Patent Number: 5,195,124
[45] Date of Patent: Mar. 16, 1993

[54] TESTING SYSTEM FOR LOCAL SUBSCRIBERS

[75] Inventor: Yuzuru Ishioka, Kawasaki, Japan
[73] Assignee: Fujitsu Limited, Kanagawa, Japan
[21] Appl. No.: 781,857
[22] Filed: Oct. 24, 1991
[30] Foreign Application Priority Data
  Oct. 26, 1990 [JP] Japan .................................. 2-289172
[51] Int. Cl.⁵ .......................... H04M 1/24; H04M 3/30
[52] U.S. Cl. ........................................ 379/27; 379/29; 379/8
[58] Field of Search ............................. 379/29, 27, 6, 8
[56] References Cited

U.S. PATENT DOCUMENTS

3,773,986 11/1973 Tremblay ............................... 379/29
4,424,421 1/1984 Townsend et al. .................... 379/27

Primary Examiner—Stafford D. Schreyer
Attorney, Agent, or Firm—Welsh & Katz, Ltd.

[57] ABSTRACT

A test system for local subscriber lines, which is used with a telephone communication system having a central office exchange, local subscribers accommodated by the central office exchange, and intervening units, i.e., a central office terminal, a subscriber side remote terminal, and a transmission line connected therebetween. This test system carries out a remote test and a local test independently by using a test line connected between remote test equipment and the remote terminal in which an artificial off-hook creation unit is introduced. This unit is made active when a local test is carried out for each subscriber line, to thereby avoid an occurrence of errors in the remote test.

8 Claims, 5 Drawing Sheets

TESTING SYSTEM FOR LOCAL SUBSCRIBERS

BACKGROUND OF THE INVENTION

1. Field of the Invention

The present invention relates generally to a transmission system for local subscribers, the system being comprised of a central office terminal and a local subscriber side remote terminal, both connected between a central office exchange and local subscribers, and more particularly, to a testing system for the local subscribers.

2. Description of the Related Art

In a usual telephone communication system, a central office exchange and the respective subscribers are connected directly to each other, but in a particular telephone communication system in which local subscribers are located far from the corresponding central office exchange, a subscriber side remote terminal is installed in the vicinity of these local subscribers. Namely the local subscribers are connected to the central office exchange via the subscriber side remote terminal and the central office terminal, for voice signal communications.

Such telephone communication system must be, of course, tested, to maintain the functions thereof in a normal state. Namely, a test is carried out to determine whether or not a fault exists between each subscriber and the subscriber side remote terminal. There are two kinds of tests carried out; a remote test and a local test. The remote test is conducted by a remote test equipment located at the central office, and the local test is conducted by using measuring apparatus at the remote terminal site.

In detail, in the remote test, a control signal is sent from the remote test equipment and transmitted to the subscriber side remote terminal, via the central office exchange and a two-way transmission line connecting these two terminals. At the subscriber side remote terminal, upon receipt of the thus-transmitted control signal, the ends of each local subscriber line are switched over by respective remote test switches to a common test line arranged so as to connect the remote test equipment separately to the two-way transmission line, whereby a remote test is carried out for each local subscriber line.

If a line fault is detected by the above remote test, then the end of the faulty local subscriber line is switched over by the remote test switch from the test line to the measuring apparatus, and then a local test is carried out to find the precise location of the fault in the local subscriber line, and investigate same.

The above-mentioned test system for local subscriber lines will be explained hereinafter in more detail with reference to the Figures. Note, this system has been proposed in U.S. Pat. No. 4,270,030, to Stephen J. Brolin et al., and assigned to the Bell Telephone Laboratories, Incorporated.

The test system of U.S. Pat. No. 4,270,030 does function well for the maintenance of the local subscriber lines, but in practice, some problems arises during the test, as explained below.

The local test is carried out not only when a line fault occurs, but also when making periodic checks on each current subscriber line. Where such a local test is carried out the remote test switch is switched over to connect the measuring apparatus by disconnecting the end of local subscriber line from both the subscriber side remote terminal and the test line. Under these circumstances, if a remote test is carried out at the same time, the remote test equipment will erroneously determine that a line fault exists in the local subscriber line that has been disconnected for the local test, even though in fact, there is no fault in the line. This erroneous determining of a fault by the remote test equipment is the related problem.

To overcome this problem, at present the maintenance operator at the remote terminal site calls the remote test equipment site and asks the operator there not to conduct the remote test with respect to the local subscriber line now being subjected to a local test.

Nevertheless, if the maintenance operator forgets to call the remote test equipment site, the remote test is started as usual, and thus the aforesaid erroneous determination is made by the remote test equipment, which then issues an unnecessary alarm signal.

SUMMARY OF THE INVENTION

Therefore, in view of the above problem, the object of the present invention is the provision of a test system for local subscribers, by which the issue of an unnecessary alarm signal is avoided.

To attain the above object, the test system is further provided with a local test switching means by which an automatic stop can be made of a remote test conducted by remote test equipment on a local subscriber line at which a local test to be carried out.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the prior art and the problems therein will be first described with reference to the related figures.

Figure 1:
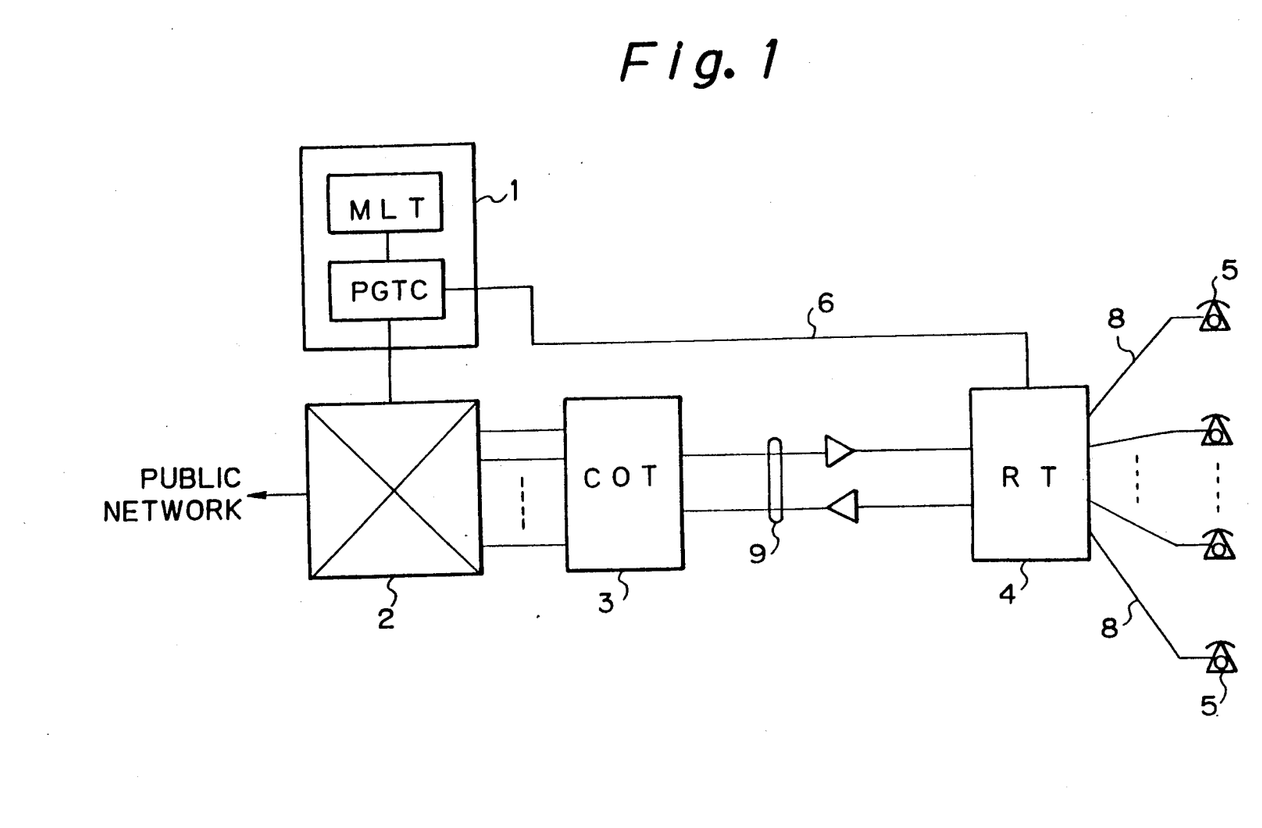
FIG. 1 is a general view of a known transmission system for local subscribers.

FIG. 1 is a general view of a known transmission system for local subscribers. In FIG. 1, the transmission system, i.e., the telephone communication system for local subscribers, is mainly comprised of a central office exchange 2, a central office terminal (COT) 3, a subscriber side remote terminal (RT) 4, a plurality of local subscribers (illustrated as telephone sets) 5, local subscriber lines 8 and a two-way transmission line 9. Among the above units, the terminals 3, 4 and the line 9 are collectively known as a "Digital Loop Carrier" (DLC) in U S. Pat. No. 4,270,030.

In FIG. 1, the test system to which the present invention relates is constructed by further employing remote test equipment 1, and a common test line 6 connected to the remote terminal 4 via the office terminal 3.

The remote test equipment 1 originally contained only a mechanical loop testing (MLT) unit, but the MLT unit alone can not cope with the newly introduced DLC mentioned above. Accordingly, a pair gain test control (PGTC) unit is introduced, as an adaptor, to the MLT unit, to cooperate with the test line 6.

Figure 2:
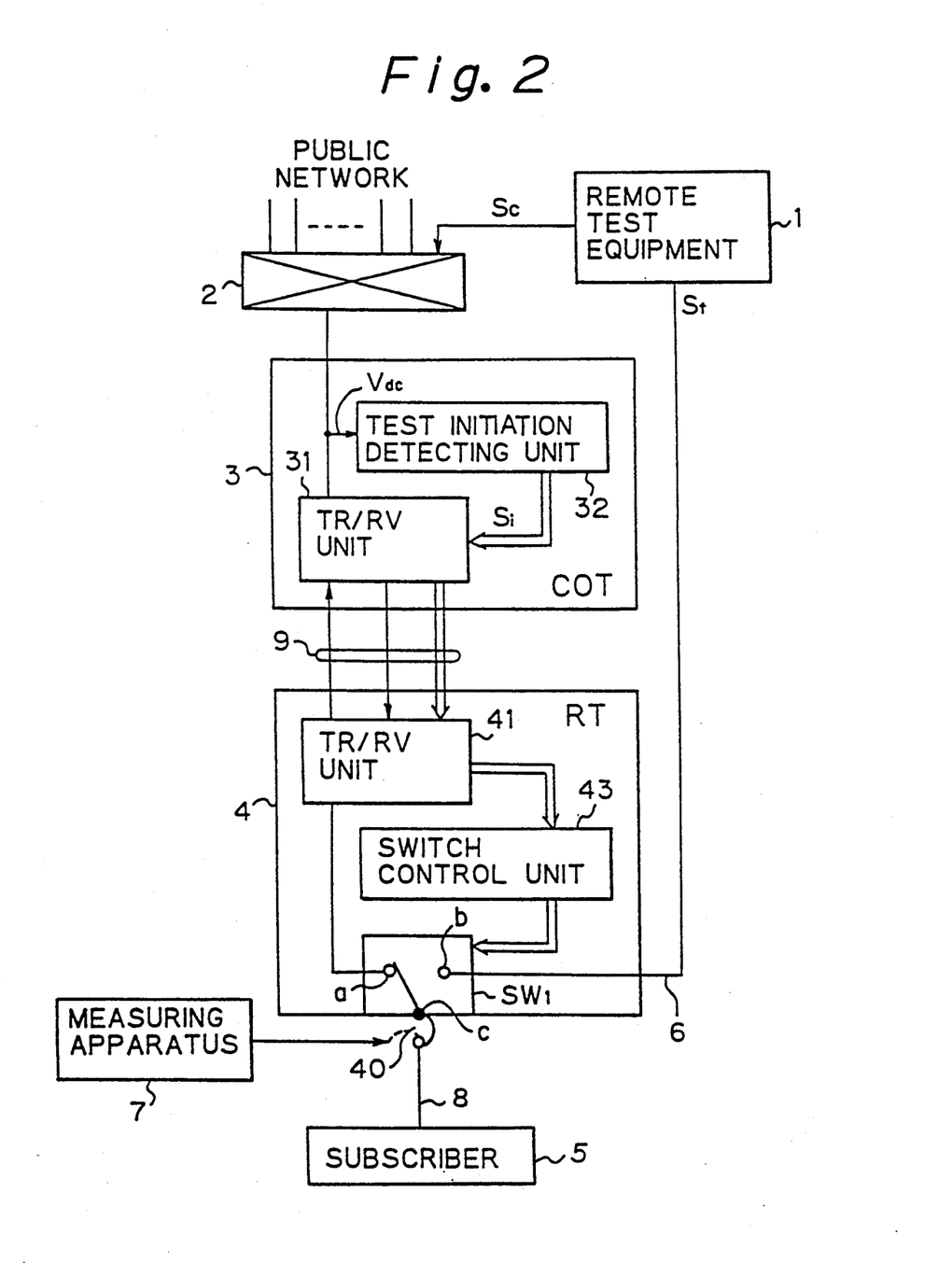
FIG. 2 is a block diagram showing in more detail a prior art test system for local subscribers, incorporated in a known telephone communication system.

FIG. 2 is a block diagram showing in more detail a prior art test system for local subscribers, incorporated in the known telephone communication system. In FIG. 2, units bearing the reference numerals 1, 2, 3, 4, 5, 6, 8 and 9 have been explained with reference to FIG. 1.

In this system, the remote test equipment 1 produces a test signal $S_t$ for detecting a fault in the local subscriber line 8, and further, produces a control signal $S_c$ for initiating an overall test. The control signal $S_c$ is received by the central office exchange 2, and the exchange 2 then selects one channel to be sequentially tested. The selection is made in accordance with the dial number received with the signal $S_c$.

The central office terminal (COT) 3 is connected to the central office exchange 2, for transmitting and receiving voice signals through a transmitting/receiving (TR/RV) unit 31. Also, the office terminal 3 contains a test initiation detecting unit 32 which, when detecting a particular DC voltage signal $V_{dc}$ output from the exchange 2 based on the signal $S_c$, issues a test initiation signal to the subscriber side remote terminal (RT) 4 via the TR/RV unit 31 and the transmission line 9. In this case, the test initiation signal $S_i$ is transformed into a flag bit ("0" or "1") among a plurality of bits composing a digital transmission signal output from the TR/RV unit 31.

The subscriber side remote terminal (RT) 4 is comprised of a transmitting/receiving (TR/RV) unit 41, a remote test switch $SW_1$ and a switch control unit 43. The remote test switch $SW_1$ is usually at a terminal "a", for a transmission of inherent voice signals, but when the flag bit ("1") among the digital transmission signal bits is received at the TR/RV unit 41, the switch control unit 43 detects the flag bit ("1") indicating that the remote test should be carried out. Accordingly, the unit 43 switches over the terminals of the remote test switch SW from the terminal "a" to a terminal "b", to connect same with the test line 6 and receive the test signal $S_t$. The test signal $S_t$ is composed of a predetermined DC current or a tone signal.

The subscriber, i.e., a telephone set 5, is connected at one end with the local subscriber line 8, and at the other end with a common terminal "c" of the remote test switch $SW_1$ via a link means 40. The link means 40 selectively connects the other end of each local subscriber lines 8 with a measuring apparatus 7. This measuring apparatus 7 is used to manually investigate whether or not a line fault exists in each of the local subscriber lines 8. The apparatus 7 is commonly connected to a plurality of switches $SW_1$, mounted in a one-to-one correspondence with each subscriber 5. Note, only one switch $SW_1$ is illustrated, for brevity; this also applies to the local subscriber lines 8 and the subscribers 5. The apparatus 7 can produce a variety of signals, such as tone signals, ringing signals and so on.

A signal flow in the system of FIG. 2 during a usual speech state is as follows. A channel signal from the public network is selected at the central office exchange 2 and transmitted to the subscriber side remote terminal (RT) 4, via the transmitting/receiving (TR/RV) unit 31 of the central office terminal (COT) 3, and the channel signal received at the TR/RV unit 41 is supplied to the terminal "a" of the remote test switch $SW_1$. In this usual speech state, as previously mentioned, the local subscriber line 8 is connected to the TR/RV unit 41 via the link means 40 and the terminal "a", whereby the subscriber 5 is connected to the central office exchange 2.

In the above system, a test is carried out in the following manner. Note, this test is aimed at finding a fault in the local subscriber line 8, between the subscriber side remote terminal 4 and the subscriber 5.

The remote test will be first explained. The remote test equipment 1 first confirms that the local subscriber line 8 to be tested is not in use, i.e., is in a usual speech state, and if the line 8 is not in use, the remote test is started by issuing the test initiation signal $S_i$. The signal $S_i$ causes the remote test switch $SW_1$ to change-over to the terminal "b" thereof, and thus the test signal $S_t$ is directly applied from the equipment 1 to the subscriber 5, via the lines 6 and 8, whereby a test of the subscriber 5 is carried out.

When the local test is to be carried out, however, the link means 40 is switched to the other connection state in which both the lines 8 and the corresponding subscriber 5 are subjected to the local test, to thereby precisely determine the condition of these units.

In this case, as mentioned above, the link means 40 is connected to the measuring apparatus 7, and therefore, the common terminal "c" of the remote test switch $SW_1$ is electrically open. Accordingly, if the remote test equipment 1 starts the remote test of the related subscriber, at the same time, an unnecessary alarm is issued. This is the problem to be solved by the present invention.

Figure 3:
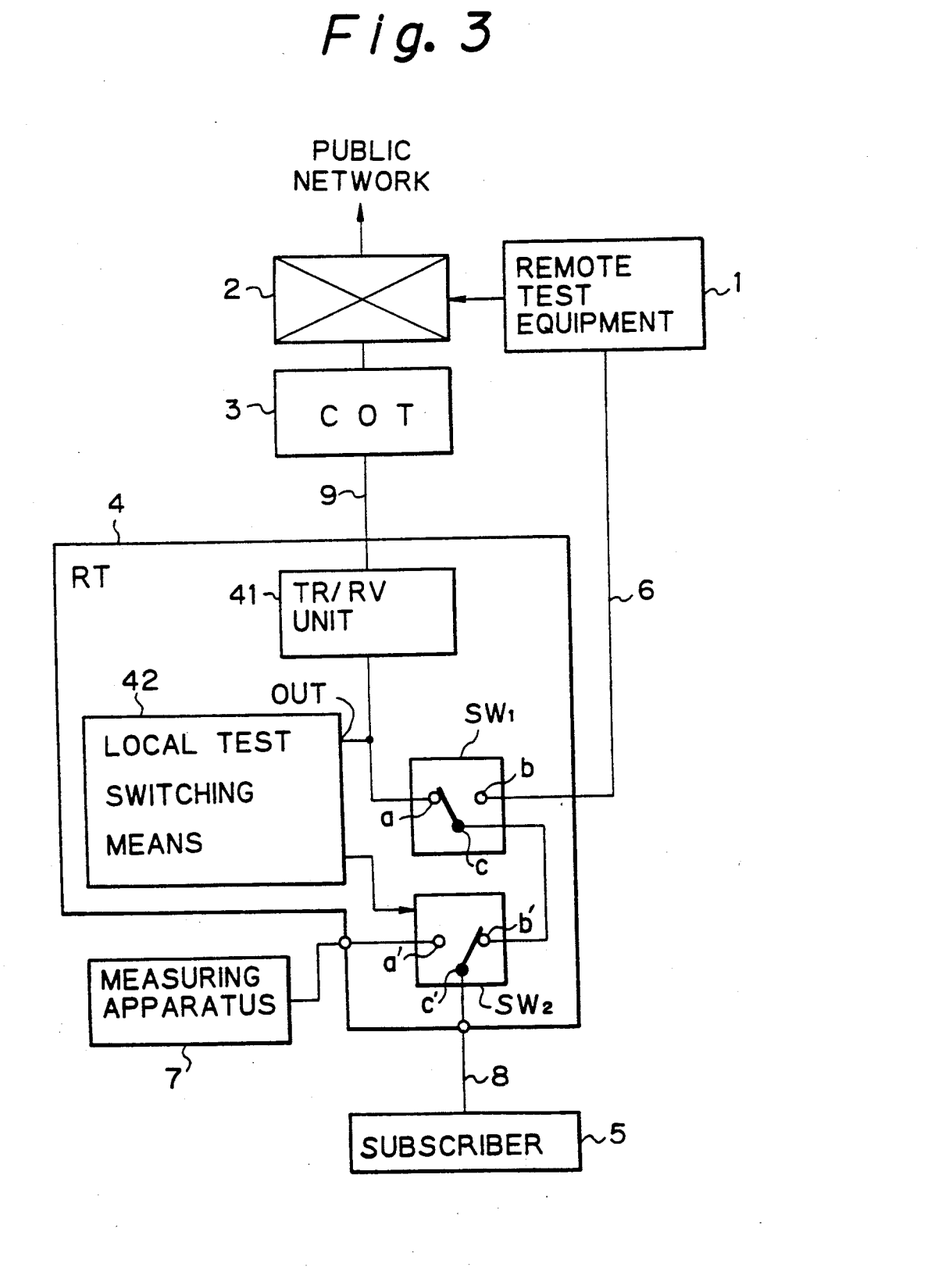
FIG. 3 is a block diagram showing a principle of the construction of the present invention.

FIG. 3 is a block diagram showing the principle of the construction of the present invention. In this figure, units identical to those explained before bear the same reference numerals or characters. As shown in FIG. 3, a local test switching means 42 is newly introduced into the test system shown in FIG. 2, i.e., to the subscriber side remote terminal (RT) 4. The local test switching means 42 operates to automatically stop a remote test conducted by the remote test equipment 1 for the local subscriber line 8 at which the local test is to be carried out.

Specifically, the local test switching means 42 notifies the central office exchange 2 that the subscriber 5 connected to the local scriber line to be tested is in use, i.e., is in an usual speech state, although this is not the case.

In practice, preferably the local test switching means 42 cooperates with a local test switch $SW_2$ as shown in FIG. 3. Namely, the local test switch $SW_2$ introduced, instead of the link means 40, has a common terminal "c'", connected to one end of the local subscriber line 8, a terminal "a'" connected to the measuring apparatus 7, and a terminal "b'" connected to the common terminal "c" of the remote test switch $SW_1$. The remote test switch $SW_1$ has terminal "b" connected to the common test line 6 and a terminal "a" connected to the two-way transmission line 9. The terminal "a" is also connected to the output of the local test switching means 42, and the local test switching means 42 switches the local test switch $SW_2$ from the terminal "b'" to the terminal "a'" thereof when a local test is to be carried out.

The local test switching means 42 exhibits, at the output "out" thereof, an artificial channel state equivalent to a state such that the related subscriber 5 is in use, i.e., is in a usual speech state. Namely, the local test switching means 42 notifies the central office exchange 2 of an artificial in-use state of the related subscriber 5.

Therefore, it is possible to carry out a local test without calling the central office site to notify same that the local test will be made, and thus the remote test must be stopped, as in the prior art. The above notification can be executed automatically by only hardware, and accordingly, an unnecessary alarm will not be issued even if the maintenance operator forgets to notify the central office site.

Figure 4:
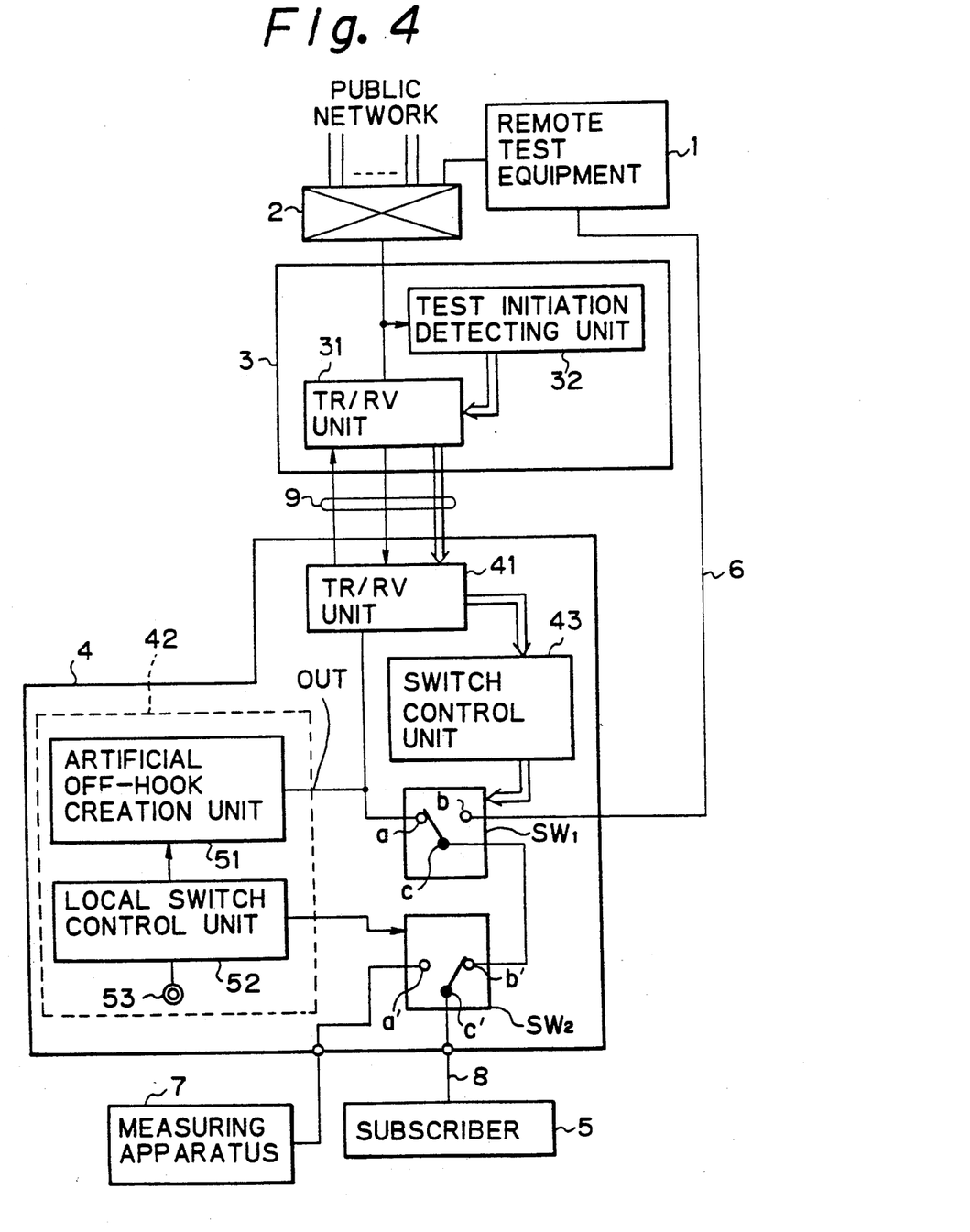
FIG. 4 is a block diagram showing an embodiment according to the present invention.

FIG. 4 is a block diagram showing an embodiment according to the present invention. As shown in FIG. 4, the local test switching means 42 is comprised of an artificial off-hook creation unit 51, a local switch control unit 52, and a local test command button 53.

The artificial off-hook creation unit 51 selectively exhibits, at the output thereof, the artificial channel-in-use state equivalent to a state wherein the related subscriber 5 is using the line. The local switch control unit 52 operates to activate the artificial off-hook creation unit 51 and to switch the local test switch $SW_2$ from the terminal "b'" to the terminal "a'" thereof whenever the local test is to be carried out. The local test command button 53 activates the local switch control unit 42, when pressed by the maintenance operator.

Namely, when the local test is to be carried out, the maintenance operator presses the local test command button 53 to activate the local switch control unit 52, and accordingly, the switch $SW_2$ is switched from the terminal "b'" to the terminal "a'" thereof, (i.e., the common terminal "c" of the $SW_1$ is electrically opened) so that the measuring apparatus 7 is connected to both the local subscriber line 8 and the subscriber 5, to investigate same, and at the same time, the artificial off-hook creation unit 51 is activated to provide an off-hook state of the line to the central office exchange 2. In this state, the exchange 2 can not gain access to the related subscriber 5, due to the artificial off-hook state thereof, and accordingly, even if the remote test equipment 1 attempts to carry out a remote test for this subscriber 5, it cannot do so because the exchange 2 will reject the command from the equipment 1 for access to the subscriber 5. Namely, the related remote test switch $SW_1$ remains as is, i.e., at the terminal "a", and thus the test line 6 cannot be connected to the related local subscriber line 8.

Figure 5:
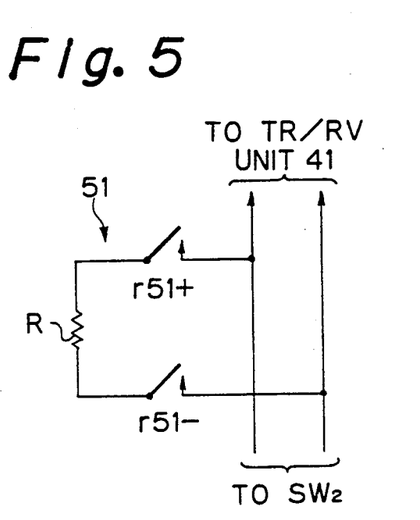
FIG. 5 is an explanatory circuit diagram showing an example of the artificial off-hook creation unit.

FIG. 5 is an explanatory circuit diagram showing an example of the artificial off-hook creation unit. It should be understood that the construction of FIG. 5 is only an example of the inside of the unit 51, i.e., the construction of FIG. 5 corresponds to the construction of a typical, conventional telephone set, and is in fact a dummy telephone set. In the operation of the unit 51, the telephone set is permanently in the off-hook state, i.e., a resistor R is fixed in the off-hook condition for the TR/RV unit 41, as illustrated in FIG. 5.

In FIG. 5, the resistor R is connected to the TR/RV unit 41 by using relay contacts r51+ and r51−.

The dummy telephone set of FIG. 5 is operative when relay contacts r51+ and r51− are made ON.

Figure 6:
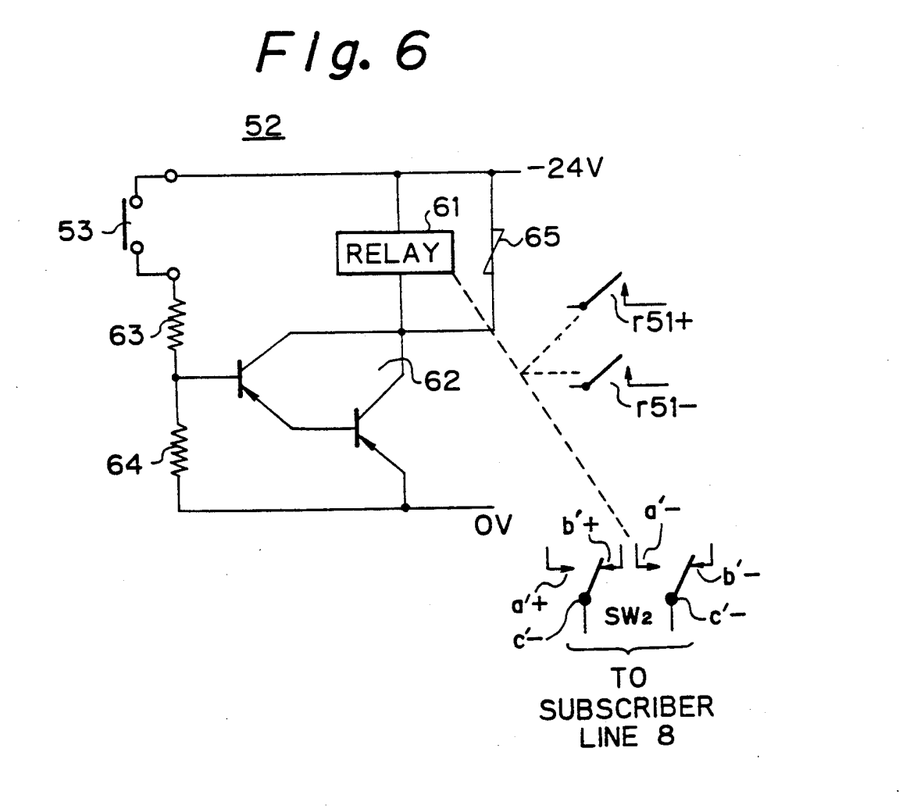
FIG. 6 is a circuit diagram showing an example of the local switch control unit.

FIG. 6 is a circuit diagram showing an example of the local switch control unit. The local switch control unit 52 of FIG. 4 can be fabricated as shown in FIG. 6. Note, an example of the local test command button 53 and an example of the local test switch $SW_2$ are also shown therein.

The unit 52 is mainly composed by a relay 61 and a Darlington-connection transistor 62, which energizes the relay 61 when the button 53 is pressed. Reference numerals 63 and 64 represent biasing resistors, and 65 is a varister protecting the transistor 62.

The relay 61 controls the relay contacts r51+, r51− thereof, as shown in FIG. 5, and other relay contacts depicted as terminals a'+, a'−, b'+, b'−, c'+ and c'−, which form the construction of the local test switch $SW_2$ of FIG. 4. Note, the symbols + and − denote one and the other of the pair of lines.

When the button 53 is pressed, the relay 61 is energized and the relay contacts r51+ and r51− are made ON, and the transfer type relay contacts are switched from the terminals b'+, b'− to the terminals a'+, a'−. Therefore, the dummy telephone is always activated while the local test is carried out.

As apparent from the above description, the test system of the present invention does not require a notification call by the maintenance operator, as needed in the prior art test system, and thus the system of the present invention reduces the amount of work required when carrying out the local test.

Further, an unnecessary alarm will not be issued by the remote test equipment because the line is disconnected during the local test, and therefore, the reliability of the remote test also can be improved.

Further, although in the above description telephone sets are used as an example, the subscriber's terminal can be a different type of terminal, such as a facsimile or telex and the like.

I claim:

1. A test system for local subscriber lines connected to a central office exchange via a subscriber side remote terminal, a central office terminal at the central office site and a two-way transmission line connected between the above terminals, the subscriber side remote terminal including remote test switches for carrying out a remote test for each local subscriber line by using a common test line distributed between each said remote test switch and remote test equipment at the central office site, each of said remote test switches being connected, at a common terminal thereof, to a link means for selectively connecting one end of each local subscriber line to a measuring apparatus, to thereby carry out a local test, wherein said subscriber side remote terminal is further provided with a local test switching means for automatically stopping said remote test conducted by said remote test equipment for said local subscriber line for which said local test is to be carried out.

2. A test system as set forth in claim 1, wherein said local test switching means operates to produce an artificial state such that said central office exchange is notified that the subscriber connected to said local line is using said local line.

3. A test system as set forth in claim 2, wherein a local test switch is introduced, instead of said link means, said local test switch having a common terminal "c'" connected to one end of said local subscriber line, a terminal "a'" connected to said measuring apparatus, and a terminal "b'" connected to a common terminal "c" of said remote test switch, the remote test switch having a terminal "b" connected to said common test line and a terminal "a" connected to said two-way transmission line, said terminal "a" being also connected to an output of said local test switching means while the local test switching means switches the local test switch from the terminal "b'" to the terminal "a'" when said local test is to be carried out.

4. A test system as set forth in claim 3, wherein said local test switching means exhibits, at an output thereof, an artificial channel state equivalent to a state in which the related subscriber line is in use, whereby the local test switching means can notify said central office exchange that the related subscriber is artificially in use.

5. A test system as set forth in claim 4, wherein said local test switching means comprises:

an artificial off-hook creation unit having an output able to selectively exhibit said artificial channel state equivalent to a state in which the related subscriber line is in use;

a local switch control unit able to activate said artificial off-hook creation unit and to switch said local test switch from a terminal "b'" to a terminal "a'" thereof whenever said local test is to be carried out; and a local test command button which activates said local switch control unit when pressed.

6. A system as set forth in claim 5, wherein said artificial off-hook creation unit is fabricated by a dummy telephone set permanently set to an off-hook state.

7. A system as set forth in claim 6, wherein said local switch control unit is comprised of a relay, and a transistor which selectively energizes the relay.

8. A system as set forth in claim 7, wherein said local test command button is connected to the base of said transistor, and said relay has first relay contacts and second relay contacts, the first relay contacts being connected in series with said dummy telephone set, and the second relay contacts forming, as transfer type relay contacts, said local test switch.

* * * * *

UNITED STATES PATENT AND TRADEMARK OFFICE
CERTIFICATE OF CORRECTION

PATENT NO. : 5,195,124
DATED : March 16, 1993
INVENTOR(S) : Yuzuri Ishioka

It is certified that error appears in the above-indentified patent and that said Letters Patent is hereby corrected as shown below:

Column 1, line 30, after "by" delete "a".

Column 1, line 60, delete "arises" and insert --arise--.

Column 1, line 65, after "out" insert --,--.

Column 2, line 29, after "test" insert --is--.

Column 2, line 66, delete "U S." and insert --U.S.--.

Column 3, line 45, delete "SW" and insert --$SW_1$--.

Signed and Sealed this

Thirty-first Day of January, 1995

Attest:

BRUCE LEHMAN

Attesting Officer    *Commissioner of Patents and Trademarks*